Patented July 22, 1941

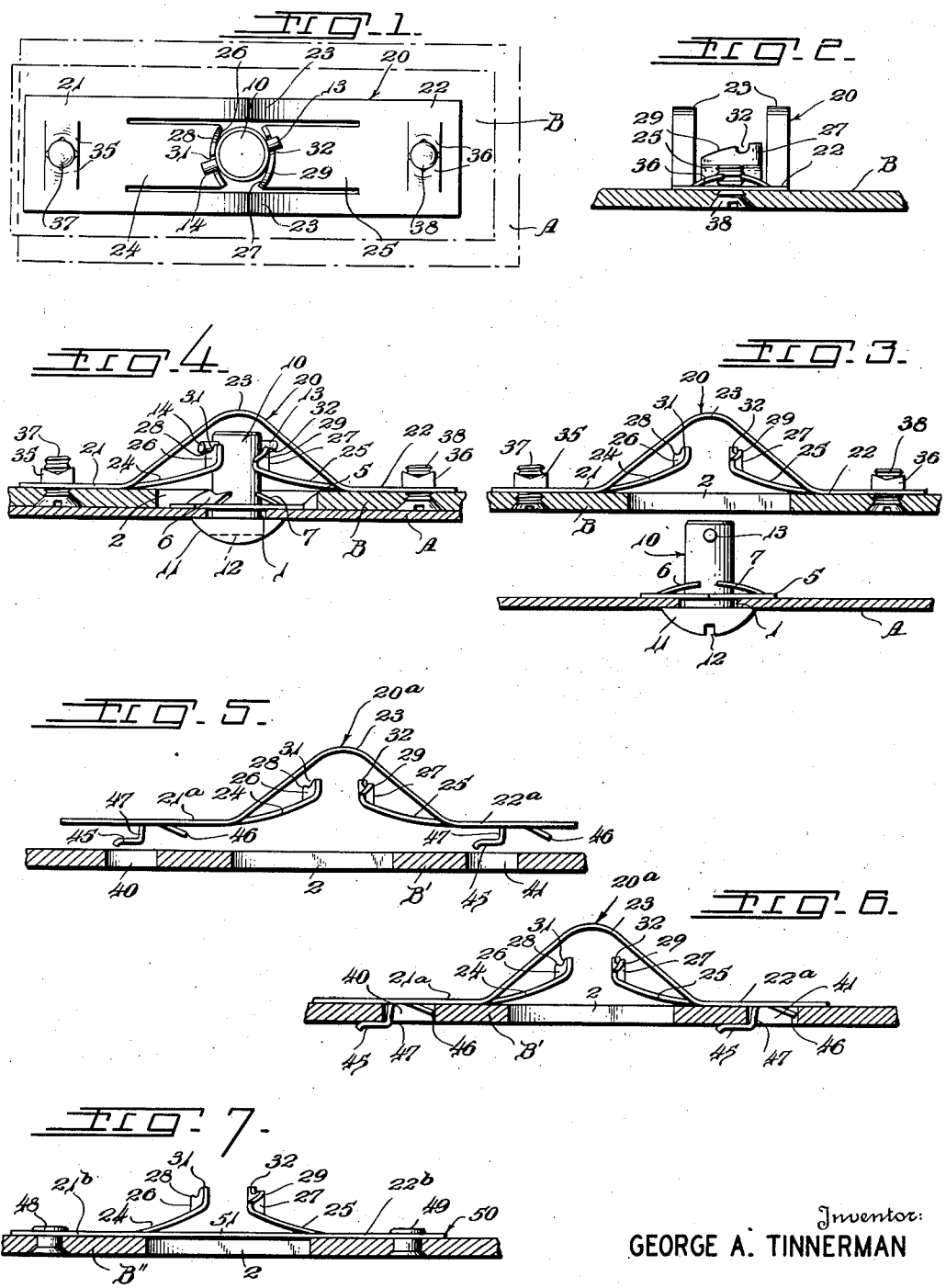

2,250,072

UNITED STATES PATENT OFFICE 2,250,072

SPRING COUPLING FASTENING DEVICE

George A. Tinnerman, Cleveland, Ohio, assignor to Tinnerman Products, Inc., Cleveland, Ohio, a corporation of Ohio Application June 27, 1940, Serial No. 342,805

20 Claims. (Cl. 24—221)

This invention relates to an improved fastening device for releasably clamping or detachably securing a plurality of superposed or juxtaposed parts.

More particularly, the invention is directed to improvements in fastening devices comprising cooperating fastening members employed in the manner of coupling units to provide a rigid and locked connection for fixedly and immovably clamping complementary parts to be secured together and yet capable of easy and quick release to permit ready separation and disassociation of such secured parts.

The fastening device of the present invention is one of general utility and may be designed readily for use in a wide range and variety of installations. The invention has particular application in installations in which a clamping coupling is required for parts which must be capable of being easily and quickly secured but also readily adapted for quick removal in a minimum of time and effort and as often as may be necessary or desirable over a long and extended period of use without mutilating or damaging the members of the fastening device.

Such fastening devices have exceptional importance and many highly practical applications in assemblies for detachably locking in place cover plates, closure panels and like parts which cover or conceal the service openings, for example, in aeroplanes, motor vehicles, etc., such as in a cowling installation or the mounting of a radiator casing, hood, or the like.

A primary object of the present invention is to provide a fastening device of this character which is of relatively simple, inexpensive construction and the respective fastening members thereof capable of very economical quantity production to the extent that the cost thereof is considerably less than any similar form of device heretofore known and available to the trade.

Another principal object of the invention is that of providing such a fastening device which is strong and durable and provides a locked and clamped connection of the parts secured under continuously effective spring force which not only prevents loosening or displacement of such parts but also guards against any possible accidental release of the members of the fastening device even under extreme conditions of vibratory motion, jarring effects, and the like.

A further object of the invention is for the provision of a fastening device of this character embodying a pair of cooperating fastening members adapted for ready coupling to provide a positive lock of the parts secured in clamped relation, and yet, capable of easy and quick uncoupling or release to permit a ready separation of such secured parts.

Further objects and advantages and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which:

Fig. 1 is a plan view of superposed parts secured by the fastening device of the invention and in which the stud member is shown in final applied fastening engagement with the sheet metal spring fastening member;

Fig. 2 is a sectional view showing the spring fastener in end elevation and illustrating one method of attaching the same to its associated part to be secured;

Fig. 3 is a vertical sectional view in which the spring fastening member appears in side elevation as attached to one part with the stud member attached to a cooperating part in position to be secured thereto;

Fig. 4 is a view similar to Fig. 3 showing the parts as secured upon rotating the stud member to the coupled relation thereof with the spring fastening member;

Fig. 5 is a side elevational view of the spring fastener as provided with a form of clip type of attaching means and shown in position to be attached to an associated part;

Fig. 6 is a similar view showing the spring fastening member in fully attached position; and, Fig. 7 shows a further embodiment of the sheet metal spring fastening member which comprises a generally flat body and which may be attached to its associated part by rivets, as shown, or any of the equivalent attaching means contemplated.

Generally speaking, the present invention embodies a separable fastener which requires simply two principal elements, namely, a stud member, and a sheet metal spring fastening member, the latter being adapted to be brought into a tightly held locking engagement with the stud member by a turning movement of either of the members, the non-turnable member preferably being fixedly mounted so that a spring locking action may be exerted between the members when the turning movement brings them into locking position.

The spring fastening member is formed from a simple sheet metal blank or stamping and may have either a generally flat or bent body from which are provided cooperating spring sections adapted to engage elements on the stud fastening member in a manner to exert an axial drawing action thereon and thereby cause the parts secured to be clamped firmly and rigidly under a continuous spring force. This spring force not only prevents looseness or displacement of the secured parts but also provides a positive locked relation of the fastening members which eliminates possibility of accidental disassociation or unintended disengagement thereof from applied fastening position and yet permits easy and quick release of said fastening members and separation of the parts secured in a minimum of time and effort in the manner intended.

Referring now, more particularly, to the drawing, the fastening device is shown embodying a pair of cooperating fastening members comprising a rotatable stud 10 and a spring fastener 20 adapted for cooperative coupling action in securing two or more complementarily fitted parts A, B, in an installation. Such parts may be of any suitable material with the secured portions thereof usually assuming the form of complementary plates of which part B may be termed the supporting plate comprising, for example, the body of an aeroplane adjacent a service opening therein, with part A being a portion of the cover plate secured thereto to cover such service opening but capable of being easily and quickly released and removed, if desired, to permit access to such service opening for any desired purpose. Of course, the members 10, 20, of the fastening device may be in reversed position depending upon which side of the secured parts is more readily accessible and the rotatable member of the fastening device most conveniently manipulated. In this respect, the spring fastener 20 may be employed as the member which is rotated to provide the necessary relative rotation of the said members 10, 20, of the fastening device to provide the locked coupling engagement thereof in applied fastening position in the manner presently to be described.

As best seen in Fig. 3, in a most common type of installation, the stud fastening member 10, preferably is rotatably disposed with respect to the cover plate or other part A by extending through an aperture 1 therein to project from the rearward face thereof. The stud 10 is freely rotatable in such aperture with the head 11 thereof abutting the outer face of such part and provided with any suitable means adapted to be engaged effectively by the fingers of the operator or by a tool for turning purposes. In the present example, a simple form of tool receiving recess is shown provided by slot 12 in which a screw driver may be engaged, but it is quite obvious other similar means may be provided in various ways as by forming such head of angular or other form adapted to be engaged readily by a wrench, pliers, or other suitable tool.

Said stud 10, in such rotatable disposition in the aperture 1, is preferably but not necessarily permanently attached to said part A as shown in Fig. 3, by means of a locking plate 5 or similar washer, or the like, which is fixedly secured to the shank of the stud in a manner to cooperate with the head 11 thereof in engaging opposite faces of said part A to retain said stud in operative rotatable attached position thereon. The locking plate 5 of the character shown comprises a sheet metal section having a disc-like, resilient base provided with a pair or more of cooperating tongues 6, 7 struck and formed therefrom to define an opening therebetween for receiving the stud 10 with the extremities thereof adapted for biting engagement with such stud in applied fastening position. By this biting action the locking plate is fixedly secured to the stud with the base 11 thereof resiliently engaging the adjacent face of part A and having frictional, sliding contact therewith to turn with the stud when the same is rotated for coupling or uncoupling purposes.

The stud 10 otherwise is of sufficient length to extend through the combined thickness of the parts A, B, and at a predetermined point from the head 11 thereof, is provided with a transverse bore in which a cross-pin is fixedly secured in any suitable way as by a drive or press fit in a manner whereby the ends 13, 14, thereof define lateral lugs or extensions on said stud. An equivalent construction may be provided by a stud having integral ears or other projections at diametric points assuming more or less the same character as the laterally projecting ends 13, 14, of the cross-pin and serving the same general purpose in operation and use, as presently to be described.

The complementary part B is provided with an enlarged opening 2 which, when the parts A, B, are in juxtaposed position, is aligned or concentrically arranged with respect to opening 1 in part A and otherwise is of a diameter sufficient to permit ready passage of the lateral lugs 13, 14, on the stud and preferably, also receive the locking plate 5 in order that the parts A, B, may be brought into close, flush engagement in assembled relation, substantially as shown in Fig. 4.

The cooperating spring fastening member 20 rests upon the outer face of part B and is provided with cooperating spring sections defining securing elements which engage the lateral lugs 13, 14, on the stud with progressively increasing spring force and otherwise hold such lateral lugs in locked relation therewith after said stud has been passed through opening 2 in part B and rotated relatively to said securing elements of the spring fastening member a predetermined portion of a revolution. In this respect, it will be appreciated that relative rotation of approximately ninety degrees, more or less, is all that is necessary to couple the fastening members 10 and 20 and thus either may be the rotatable member with the other fixed to its associated part. In the present example, the stud 10 is shown rotatably disposed with respect to part A and the cooperating spring fastener 20 fixedly attached to part B but it is quite obvious this arrangement may be reversed with said stud 10 rigidly secured to part A or otherwise held in fixed relation thereto while the cooperating spring fastener 20 is rotated relatively thereto and engaged therewith in the manner of a threadless spring nut, or the like.

The spring fastening member 20 is a relatively simple and cheap article of manufacture in that it may be most economically constructed from a comparatively small, inexpensive section of any suitable sheet metal, preferably of a spring metal nature, such as spring steel or cold rolled metal having spring-like characteristics. The fastener, of course, may be formed from sheet metal sections of various outlines, but from the standpoint of economical quantity production is most advantageously provided from a generally rectangular blank obtained from ordinary sheet metal strip stock with little or no loss or waste of material. A blank or stamping of such character is bent into the general form of a substantially U-shaped or V-shaped configuration between base flanges 21, 22, defined by the extremities of the blank and which are provided with suitable means for attaching the device in position on its associated part B. The spring fastening member is thus formed with a foreshortened base and embodies a substantially intermediate projecting body comprising spaced, opposed body portions 23 from which may be provided a pair or more of relatively long resilient spring arms 24, 25.

In a general way, it will be understood that such spring arms 24, 25 are provided in the blank or stamping by suitable longitudinally extending slits on either side of a transverse slot in the center area thereof. Said transverse slot is of such character as to form the desired shape to the free ends of said spring arms 24, 25 to provide oppositely extending cam surfaces or trackways and associated locking indentations or notches on the extremities thereof designed for cooperative fastening engagement with the lateral lugs or extensions 13, 14, of the rotary stud 10. It will be appreciated, however, that the illustrated construction of the sheet metal fastening member 20 with a foreshortened base defining opposing body portions 23 from which the spring arms 24, 25 are struck and formed, provides for the desired added length in such spring arms in a manner whereby the same may be formed into relatively long, longitudinally, curved spring elements having an increased resiliency which otherwise would not be obtainable and with the end portions thereof capable of being bent into upstanding abutments or lips 26, 27, respectively. As best seen in Fig. 1, said end portions defining such abutments or lips 26, 27, preferably are curved generally transversely of the spring arms to correspond substantially to the cross-section of the stud 10, with the extremities thereof, as illustrated in Fig. 2, fashioned in the manner of generally spiral cam surfaces, guideways, or inclined trackways 28, 29, respectively, Fig. 2 extending in opposite directions and provided with indents or notches 31, 32, adapted to receive the lateral lugs 13, 14, on the stud 10 in locking relations 13, 14, on the stud 10 in locking relation therewith. Said notches 31, 32 otherwise set the limit of travel of said lugs 13, 14, on said cam surfaces 28, 29, and thereby determine the necessary amount of rotation of said stud to applied fastening position with the securing elements 26, 27 of the spring fastener. The length of travel of the stud, being limited by the disposition of such notches 31, 32, can be varied, of course, to satisfy any set of circumstances as governed by the overall size and proportion of the fastening members 10, 20, and the amount of rotation desired for the stud in any case.

The sheet metal spring fastening member 20 just described is preferably formed with the spring arms 24, 25, inclined toward each other and slightly bowed longitudinally with the curved upstanding abutments or lip portions 26, 27, provided on the free ends thereof forming, what may be termed, a yieldably mounted socket for receiving the stud 10 which is applied thereto substantially as shown in Fig. 1. The spring arms 24, 25 are supported in their inclined relation to each other by the bent body portions 23 and also by the base flanges 21, 22, by which the device may be fixedly secured to its associated part B to maintain the spring arms 24, 25 in operative position at all times to receive the cooperating stud 10 and securely hold the same when rotated relatively thereto to final applied fastening position.

Inasmuch as the spring fastener 20 is preferably constructed of sheet metal, the base flanges 21, 22, thereof are admirably suited for the provision of attaching means comprising integral bolt or screw thread engaging means in the form of cooperating tongues 35, 36, or the like, which may be struck and formed therefrom and designed for threadedly engaging an attaching bolt or screw substantially in the manner of a self-locking nut. Such integral thread engaging means in the base flanges, of course, may be provided in any other suitable form or construction depending on the strength required and the use to which the device is put, so long as the elements thereof threadedly engage the attaching bolts 37, 38, as they are driven home, it being understood that such attaching bolts pass through suitable apertures in the part B to which the spring fastener 20 is attached. However, it has been found that such thread engaging means prepared in the form of cooperating tongues, as shown, are the most efficient and most practical in that they are possessed of unusual inherent strength and will not collapse or pull through on tightening of the bolt nor loosen from fastening engagement under constant strain, heavy usage and rough handling of an installation in which they are employed. This takes place by reason of the fact that such tongues tend, more effectively, to move toward each other on tightening of the bolt or screw such that the extremities of such tongues dig or bite into the grooves defined by the thread convolutions and thereby become embedded in the root diameter of such threaded member in locked threaded fastening engagement therewith. Thus, any vibration, jarring or strain taking place in a completed installation cannot cause displacement, reverse rotation or tend toward unscrewing of the threaded fastening member from applied fastening position. It will therefore be appreciated that in the provision of such integral thread engaging means 35, 36, the use of individual threaded nuts or lock washers of any kind is entirely dispensed with thereby making for a considerable saving not only in the cost of such nuts and lock washers, but also materially reducing the expense and labor involved in the tedious, time-consuming assembling operations which such fastenings require.

It will be understood that the resilient spring fastening member 20 thus provided is easily and quickly mounted on the part B by its base flanges 21, 22, provided with such thread engaging means 35, 36, in threaded fastening engagement with securing bolts or screws 37, 38. The heads of the securing bolts preferably are countersunk such that the exterior of said part B is a substantial plane surface against which the cooperating part A may be brought into close, flush contact therewith, as illustrated in Fig. 4.

In attaching the spring fastener 20 to part B over the stud passage 2, the same is adjusted thereon such that the spring arms 24, 25, thereof are in suitable alignment with such passage in position to receive evenly and uniformly between the end portions 26, 27, thereof, the leading end of the cooperating stud 10 mounted on the complementary part A, as aforesaid, and substantially as shown in Fig. 3. In this relation, the extremities of said spring arms are designed to support the oppositely extending spiral cam surfaces or inclined trackways 28, 29, in a manner whereby the lateral extensions 13, 14, on the stud may be easily and quickly introduced therebetween and readily engaged therewith with progressively increasing spring force as the stud is rotated to applied fastening position. To this end, the said spiral cam surfaces in the normal untensioned relation of the spring arms 24, 25, are designed in a manner whereby the lowest points thereof have a spacing from the adjacent face of part B, a distance equal to or slightly less than the distance the lateral lugs 13, 14 extend from such face of part B in the projecting relation of the stud 10 through the passage 2 therein as seen in Fig. 4. Referring to Fig. 2, it will be understood that from such lowest points, the spiral cam surfaces or inclined trackways 28, 29 increase in height or relative distance from the adjacent face of part B to the notches 31, 32. The bottom walls or edges of said notches 31, 32 are also spaced from the adjacent face of part B a greater distance than the lowest points of said spiral cam surfaces or guideways 28, 29. Said notches 31, 32 otherwise are designed to engage the lateral lugs 13, 14 of the stud to limit rotation thereof and also provide locking recesses receiving said lateral lugs or extensions to lock the stud in fastening position and prevent accidental or unintended rotation thereof in a reverse direction from applied fastening position.

In operation, when part A is superimposed on part B, as by the application of a cover plate to a service opening in an aeroplane, the stud 10 on part A extends through the passage 2 in part B between the upstanding abutments or lips provided by the bent free portions 26, 27 of the spring arms 24, 25, of the spring fastener. Said free end portions 26, 27 preferably are somewhat curved, as best seen in Fig. 1, to correspond substantially to the contour of the stud member to define a resiliently disposed socket made up of opposing independently movable socket sections adapted readily to receive therebetween the leading end of the stud member substantially as shown in Fig. 3. When the parts A, B, are disposed substantially in abutting relation, the lateral lugs or extensions 13, 14, on the stud project from such outer face of part B a sufficient distance to engage or slightly clear the lowest points of the spiral cam surfaces or inclined trackways 28, 29, as said stud 10 is subjected to its initial clockwise turning movement effected, for example, by a screw driver applied to the recess 12 in the head thereof. Upon continued rotation of the stud through a predetermined portion of a single revolution, said lateral lugs or extensions 13, 14, ride up upon the spiral cam surfaces 28, 29, in a manner whereby the spring arms 24, 25 are depressed and thereby flexed under tension to cause the plates A, B to be clamped together under progressively increasing spring force. When rotation of the stud places the lateral lugs 13, 14, in the region of the notches 31, 32, said lugs snap into said notches in a manner whereby further rotation of the stud is arrested and the same otherwise locked in such applied fastening position substantially as shown in Figs. 1 and 4. In this relation, there is a pronounced downward flexion and tensioning of the spring arms 24, 25 from their normal untensioned relation which automatically produces a continuously effective reverse spring force tending to maintain the lateral lugs 13, 14 rigidly seated in the notches 31, 32. This, of course, holds the stud against any possible reverse rotation toward disengagement from the securing elements 26, 27 of the spring arms unless and until the stud is rotated reversely by the application of a suitable tool in properly uncoupling the fastening members.

The coupling arrangement of the present invention, therefore, is such as not only to lock together the cooperating members 10, 20, of the fastening device against accidental or unintended release from securing position, but, by reason of the continually effective spring force exerted by the spring arms 24, 25, the parts A, B are firmly and rigidly clamped together in such manner as to prevent any possible looseness or displacement of said parts even under extreme conditions of shock, vibratory motion, or the like.

Quick and easy release of the secured parts may be readily effected simply by rotating the stud 10 in a reverse direction under tool force whereupon the lateral lugs or projections 13, 14, will cause suitable flexing and depression of the spring arms 24, 25 sufficient to permit said lugs to move out of the notches 31, 32. By continued reverse rotation of the stud, said lateral lugs 13, 14 will ride downward on the spiral cam surfaces 28, 29, finally disengaging therefrom in the space between the end portions 26, 27 of the spring arms, whereupon the stud is fully released and is readily removable from the spring fastener, substantially in the manner shown in Fig. 3.

It will be appreciated, of course, that the flexion or depression taking place in the spring arms 24, 25, either in coupling or uncoupling the cooperating members of the fastening device results in no permanent distortion or deformation of the metal of the spring fastener, so that upon such release of the fastening members from locked relation, as aforesaid, the various elements of the spring fastener automatically assume their initial, normally untensioned configuration ready for coupling engagement with the stud member 10 in the same or similar installation in a repetition of the previously described procedure.

It is to be understood that the present invention fully contemplates various other arrangements than that shown in Figs. 1 to 4 inclusive for attaching the spring fastener to its associated part by the base flanges thereof and thus, instead of the integral thread engaging means 35, 36, there may be employed conventional threaded nuts threaded onto bolts passing through apertures in such base flanges to secure the spring fastener in attached position.

Along the same lines, as shown in Figs. 5 and 6, the spring fastener 20ª, similar in structure, operation and use to that described with reference to Figs. 1 to 4 inclusive, has its base flanges 21ª, 22ª, provided with integral attaching elements in the form of spaced, locking clip means received in the correspondingly spaced openings 40, 41, respectively, in the supporting part B' by a sliding action to applied fastening position. In a preferred form, such clip fastening means each comprises an attaching finger element 45 and cooperating locking detent 46 struck and formed from the base flange to project from the undersurface thereof. Such attaching finger 45 extends generally parallel to the base flange from which it is struck and formed and is spaced therefrom in normal untensioned relation a distance substantially equal to or slightly less than the thickness of the supporting part for frictionally and grippingly engaging the same. The cooperating locking detent 46 may be provided of any suitable character to extend in a reverse direction to the attaching finger 45 and is preferably provided by a small slit portion which is pressed out of the plane of the flange such that the free end of the detent presents a relatively sharp shoulder. The engaging point of such detent 46 is preferably spaced from the effective shoulder portion 47 of its cooperating attaching finger 45 a distance substantially equal to or slightly less than that between opposite walls of the assembling opening or slot, 40 or 41, receiving the same to snugly engage therein in the final applied position of the fastener.

The attaching fingers 45 extend in the same direction for application to the respective assembling openings 40, 41, substantially as shown in Fig. 5, and when passed through such openings to seat the base flanges 21ª, 22ª on the upper surface of said part B', the spring fastener is slid longitudinally such that said attaching fingers engage the lower reverse side of said part B' adjacent said openings 40, 41, in final applied fastening position as shown in Fig. 6. During this operation, the locking detents 46 are somewhat depressed against said part B' and in this fully attached position of said fingers 45, the locking detents are designed to snap outwardly into said openings 40, 41, and engage the walls of said openings opposite to those engaged by the shoulder portions 47 of the attaching fingers 45. In this way, one or both of the detents 46 lock the spring fastener in attached position against accidental removal or any reverse sliding movement or displacement which would permit the attaching fingers 45 to move out of applied fastening position in locked engagement in the respective openings 40, 41.

Said attaching fingers 45 otherwise are designed to frictionally and grippingly engage the adjacent face of part B' and cooperate with the base flanges 21ª, 22ª, at opposite faces of said part to maintain the spring fastener firmly and rigidly in attached position thereon in alignment with the stud passage 2 and ready for operation and use substantially in the manner described with reference to Figs. 1 to 4 inclusive.

Fig. 7 is intended to represent still another method of attaching the spring fastener as by welding the base flanges 21ᵇ, 22ᵇ thereof directly to the outer face of part B" or by the use of equivalent rivet elements 48, 49, or the like. A further embodiment of the invention also is illustrated in Fig. 7 as respects the construction of the spring fastener, designated generally 50, with a generally flat base 51 rather than a foreshortened base as illustrated in the previously described forms of the invention. A spring fastener of this character is advantageous in certain installations in that less material is required and the spring arms 24, 25, provided thereon necessarily are not as long and, therefore, are somewhat stiffer and offer more resistance in locking engagement with the lateral lugs 13, 14 of the stud fastener. The said stud engaging portions of the spring arms 24, 25, however, are constructed in substantially the same manner by being struck and formed from the base 51 and when bent up substantially in the manner shown, present an elongated opening in said base through which the stud fastening 10 may pass and be received between the opposing upstanding abutment or lip portions 26, 27 provided on the ends of said spring arms. The stud fastener 10 may then be rotated to ride on the cam surfaces or guideways 28, 29, to engage the lateral lugs 13, 14, thereof in the notches 31, 32, in final applied fastening position in substantially the same manner described in detail with reference to Figs. 1 to 4 inclusive. It is fully contemplated in this form of spring fastener 50, comprising the generally flat base 51, that the base flanges 21ᵇ, 22ᵇ be provided with any other suitable form of attaching means such as the integral bolt or screw thread engaging elements of Figs. 1 to 4 inclusive, or the integral clip-type attaching means of Figs. 5 and 6.

In any form, the spring fastening member is preferably constructed of relatively thin sheet metal, the thickness thereof being selected according to service requirements and the predetermined size of the parts secured. The fasteners are most effective when provided of spring metal suitable spring tempered and heat treated to give the desired toughness and hardness, particularly in the case of fasteners which are put to heavy duty in installations where extreme vibratory motion takes place. A cheap but effective fastener may be provided from cold rolled metal, such as cold rolled steel, which is untempered but of a spring metal nature and preferably harder than that of the cooperating stud fastening member applied thereto in providing an effective and reliable fastening means adapted for a long period of satisfactory service and use.

While the invention has been described in detail with specific examples, such examples are intended as illustrations only, since it will be apparent to those skilled in the art that other modifications in the construction, arrangement, and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In a fastening device, a stud member having a shank provided with a lateral lug, a cooperating spring fastening member comprising a sheet metal section defining a base having an opening receiving said shank, a spring element having a free end and projecting from said base in yieldable relation thereto to define means cooperating with said shank of the stud member in fastening position, and a bent portion on said spring element adjacent said free end thereof defining a resiliently disposed abutment for engaging said lateral lug on the stud member under continuously effective spring force in applied fastening position.

2. In a fastening device, a stud member having a shank provided with a lateral lug, a cooperating spring fastening member comprising a sheet metal section defining a base having an opening receiving said shank, a spring element having a free end and projecting from said base in yieldable relation thereto to define means cooperating with said shank of the stud member in fastening position, and a bent portion on said spring element adjacent said free end thereof defining a resiliently disposed abutment having a cam surface for engaging said lateral lug on the stud member under continuously effective spring force in applied fastening position.

3. In a fastening device, a stud member having a shank provided with a lateral lug, a cooperating spring fastening member comprising a sheet metal section defining a base having an opening receiving said shank, a spring element having a free end and extending out of the plane of said base in yieldable relation thereto to define means cooperating with said shank of the stud member in fastening position, a bent portion on said spring element adjacent said free end thereof defining a resiliently disposed abutment, and means comprising a cam surface on the extremity of said abutment for engaging said lateral lug on the stud member with progressively increasing spring force upon relative rotation of said stud and spring fastening members.

4. In a fastening device, a stud member having a shank provided with a lateral lug, a cooperating spring fastening member comprising a sheet metal section defining a base having an opening receiving said shank, a spring element having a free end and extending out of the plane of said base in yieldable relation thereto to define means cooperating with said shank of the stud member in fastening position, a bent portion on said spring element adjacent said free end thereof definining a resiliently disposed abutment, and means provided on said abutment for engaging said lateral lug on the stud member with progressively increasing spring force upon relative rotation of said stud and spring fastening members, said means comprising a cam surface merging into an indent receiving said lateral lug to lock the stud in applied fastening position.

5. In a fastening device, a stud member having a shank provided with a lateral lug, a cooperating spring fastening member comprising a sheet metal section defining a base having an opening receiving said shank, a spring element having a free end and extending out of the plane of said base in yieldable relation thereto to define means cooperating with said shank of the stud member in fastening position, a bent portion on said spring element adjacent said free end thereof defining a resiliently disposed abutment, and means provided on said abutment for engaging said lateral lug on the stud member with progressively increasing spring force upon relative rotation of said stud and spring fastening members, said means comprising a cam surface formed on the extremity of said bent free end portion of the spring element merging into a recess receiving said lateral lug to lock the stud in applied fastening position.

6. In a fastening device, a stud member having a shank provided with a lateral lug, a spring fastening member comprising a sheet metal section defining a base and a pair of cooperating spring elements extending in the same general direction to one side of said base in yieldable relation thereto, said spring elements having spaced free ends defining an opening therebetween receiving said shank of the stud member in fastening position, and means carried by at least one of said spring elements adjacent the free end thereof defining a resiliently disposed abutment for engaging said lateral lug on the stud member and exerting an axial spring force on said stud member in such fastening position.

7. In a fastening device, a stud member having a shank provided with a lateral lug, a spring fastening member comprising a sheet metal section defining a base and a pair of cooperating spring elements extending in the same general direction to one side of said base in yieldable relation thereto, said spring elements having spaced free ends defining an opening therebetween receiving said shank of the stud member in fastening position, and a bent portion on at least one of said spring elements adjacent the free end thereof defining a resiliently disposed abutment for engaging said lateral lug on the stud member and exerting an axial spring force on said stud member in such fastening position.

8. In a fastening device, a stud member having a shank provided with a lateral lug, a spring fastening member comprising a sheet metal section defining a base and a pair of cooperating spring elements extending in the same general direction to one side of said base, said spring elements having spaced free ends defining an opening therebetween receiving said shank of the stud member in fastening position, a bent portion on at least one of said spring elements adjacent the free end thereof defining a resiliently disposed abutment, and means comprising a cam surface provided on said abutment for engaging said lateral lug on the stud with progressively increasing spring force upon relative rotation of said stud and spring fastening members.

9. In a fastening device, a stud member having a shank provided with a lateral lug, a spring fastening member comprising a sheet metal section defining a base and a pair of cooperating spring elements extending in the same general direction to one side of said base, said spring elements having spaced free ends defining an opening therebetween receiving said shank of the stud member in fastening position, a bent portion on at least one of said spring elements adjacent the free end thereof defining a resiliently disposed abutment, and means provided on said abutment for engaging said lateral lug on the stud with progressively increasing spring force upon relative rotation of said stud and spring fastening members, said means comprising a cam surface merging into an indent receiving said lateral lug to lock the stud in such fastening position.

10. In a fastening device, a stud member having a shank provided with a lateral lug, a spring fastening member comprising a sheet metal section defining a base and a pair of cooperating spring elements extending in the same general direction to one side of said base, said spring elements having spaced free ends defining an opening therebetween receiving said shank of the stud member in fastening position, a bent portion on at least one of said spring elements adjacent the free end thereof defining a resiliently disposed abutment, and means provided on said abutment for engaging said lateral lug on the stud with progressively increasing spring force upon relative rotation of said stud and spring fastening members, said means comprising a cam surface formed on the extremity of said bent free end portion of the spring element and merging into a recess receiving said lateral lug to lock the stud in such fastening position.

11. In a fastening device, a stud member having a shank provided with lateral lugs, a spring fastening member comprising a sheet metal body defining a base provided with a pair of cooperating spring elements having free ends and extending in the same general direction to one side of said base in yieldable relation thereto, means carried by said spring elements providing resiliently disposed socket sections having a space therebetween for receiving the stud member in fastening position, said socket sections being adapted to be engaged by said lateral lugs on the stud member in a manner to tension said spring elements and thereby provide an axial spring force on said stud member in such fastening position.

12. In a fastening device, a stud member having a shank provided with lateral lugs, a spring fastening member comprising a sheet metal body defining a base provided with a pair of cooperating spring elements having free ends and extending in the same general direction to one side of said base in yieldable relation thereto, and a bent portion on each of said spring elements adjacent the free end thereof providing resiliently disposed socket sections having a space therebetween for receiving the stud member in fastening position, said socket sections being adapted to be engaged by said lateral lugs on the stud member in a manner to tension said spring elements and thereby provide an axial spring force on said stud member in such fastening position.

13. In a fastening device, a stud member having a shank provided with lateral lugs, a spring fastening member comprising a sheet metal body defining a base provided with a pair of cooperating spring elements having free ends and extending in the same general direction to one side of said base in yieldable relation thereto, a bent portion on each of said spring elements adjacent the free end thereof providing resiliently disposed socket sections having a space therebetween for receiving said stud member, and means provided on said socket sections for engaging said lateral lugs on the stud member with progressively increasing spring force upon relative rotation of said stud and spring fastening members to applied fastening position.

14. In a fastening device, a stud member having a shank provided with lateral lugs, a spring fastening member comprising a sheet metal body defining a base provided with a pair of cooperating spring elements having free ends and extending in the same general direction to one side of said base in yieldable relation thereto, a bent portion on each of said spring elements adjacent the free end thereof providing resiliently disposed socket sections having a space therebetween for receiving said stud member, and means provided on said socket sections for engaging said lateral lugs on the stud member with progressively increasing spring force upon relative rotation of said stud and spring fastening members to fastening position, said means comprising oppositely extending cam surfaces including indents receiving said lateral lugs on the stud member to lock the same in such fastening position.

15. In a fastening device, a stud member having a shank provided with lateral lugs, a spring fastening member comprising a sheet metal body defining a base provided with a pair of cooperating spring elements having free ends and extending in the same general direction to one side of said base in yieldable relation thereto, a bent portion on each of said spring elements adjacent the free end thereof providing resiliently disposed socket sections having a space therebetween for receiving said stud member, and means provided on said socket sections for engaging said lateral lugs on the stud member with progressively increasing spring force upon relative rotation of said stud and spring fastening members to fastening position, said means comprising oppositely extending cam surfaces formed on the extremities of said bent free end portions of said spring elements and including recesses receiving said lateral lugs on the stud member to lock the same in such fastening position.

16. In a fastening device, a stud member having a shank provided with lateral lugs, a spring fastening member comprising a piece of sheet metal defining base portions at the ends of spaced body portions on either side of a pair of cooperating spring elements attached to said base portions and having generally opposing free ends, said spaced body portions being bent intermediate their lengths to increase the effective length of said spring elements, said spring elements extending in the same general direction to one side of said base portions and being bent to define resiliently disposed socket sections having a space therebetween for receiving said stud member, said socket sections being adapted to engage said lateral lugs on the stud member with progressively increasing spring force upon relative rotation of said stud and spring fastening members to applied fastening position.

17. In a fastening device, a stud member having a shank provided with lateral lugs, a spring fastening member comprising a piece of sheet metal defining base portions at the ends of spaced body portions on either side of a pair of cooperating spring elements attached to said base portions and having generally opposing free ends, said spaced body portions being bent intermediate their lengths to increase the effective length of said spring elements, said spring elements extending in the same general direction to one side of said base portions and being bent adjacent the free ends thereof to define resiliently disposed socket sections having a space therebetween for receiving said stud member, and means provided on said socket sections for engaging said lateral lugs on the stud member with progressively increasing spring force upon relative rotation of said stud and spring fastening members to applied fastening position.

18. In a fastening device, a stud member having a shank provided with lateral lugs, a spring fastening member comprising a piece of sheet metal defining base portions at the ends of spaced body portions on either side of a pair of cooperating spring elements attached to said base portions and having generally opposing free ends, said spaced body portions being bent intermediate their lengths to increase the effective length of said spring elements, said spring elements extending in the same general direction to one side of said base portions and being bent adjacent the free ends thereof to define resiliently disposed socket sections having a space therebetween for receiving said stud member, and means provided on said socket sections for engaging said lateral lugs on the stud member with progressively increasing spring force upon relative rotation of said stud and spring fastening members to applied fastening position, said means comprising oppositely extending cam surfaces and including recesses receiving said lateral lugs on the stud member to lock the same in such fastening position.

19. In a fastening device, a stud member having a shank provided with lateral lugs, a spring fastening member comprising a piece of sheet metal defining base portions at the ends of spaced generally flat body portions on either side of cooperating spring elements attached to said base portions and having opposing free ends, said spring elements extending in the same general direction to one side of said base portions in yieldable relation thereto, each of said spring elements being bent adjacent the free end thereof to provide resiliently disposed socket sections having a space therebetween for receiving said stud member, and means provided on said socket sections for engaging said lateral lugs on the stud with progressively increasing spring force upon relative rotation of said stud and spring fastening members to fastening position.

20. A fastening device for releasably connecting complementary parts provided with stud passages which may be aligned, said fastening device comprising cooperating stud and spring fastening members, said stud member having a shank provided with lateral lugs and being rotatably attached to one of said parts in the stud passage therein, said spring fastening member comprising a piece of sheet metal defining base flanges at the ends of spaced body portions on either side of a pair of cooperating spring arms extending from said base portions and having generally opposing free ends, means on said base flanges for attaching the spring fastener to another of said parts with the spring arms thereof overlying the stud passage therein, said spaced body portions of the spring fastener being bent intermediate their lengths to increase the effective length of said spring arms, said spring arms extending in the same general direction to one side of said base flanges and being bent adjacent the free ends thereof to define resiliently disposed socket sections having a space therebetween for receiving said stud member through the aligned stud passages in said parts, and means provided on said socket sections for engaging said lateral lugs on the stud with progressively increasing spring force upon relative rotation of said stud and spring fastening members to fastening position in a manner whereby said parts are clamped together under continuously effective spring tension, said means comprising oppositely extending cam surfaces on said socket sections and including indents receiving said lateral lugs on the stud member to lock the same in such fastening position.

GEORGE A. TINNERMAN.